(12) United States Patent
Maennel

(10) Patent No.: US 8,276,124 B2
(45) Date of Patent: Sep. 25, 2012

(54) CONSTRUCTING PETRI NETS FROM TRACES FOR DIAGNOSTICS

(75) Inventor: Hartmut Maennel, Zurich (CH)

(73) Assignee: Microsoft Corporation, Redmond, WA (US)

( * ) Notice: Subject to any disclaimer, the term of this patent is extended or adjusted under 35 U.S.C. 154(b) by 1457 days.

(21) Appl. No.: 11/820,594

(22) Filed: Jun. 20, 2007

(65) Prior Publication Data

US 2008/0320437 A1 Dec. 25, 2008

(51) Int. Cl.
*G06F 9/44* (2006.01)
(52) U.S. Cl. ......... 717/128; 717/125; 717/127; 717/130
(58) Field of Classification Search .................. None
See application file for complete search history.

(56) References Cited

U.S. PATENT DOCUMENTS

| | | | |
|---|---|---|---|
| 6,173,440 B1 | 1/2001 | Darty | |
| 6,185,469 B1 * | 2/2001 | Lewis et al. | 700/99 |
| 6,587,995 B1 | 7/2003 | Duboc et al. | |
| 6,671,874 B1 | 12/2003 | Passova | |
| 6,694,505 B1 * | 2/2004 | Tan | 717/100 |
| 7,127,701 B2 * | 10/2006 | Fables et al. | 717/124 |
| 7,966,621 B2 * | 6/2011 | Kraft et al. | 719/320 |
| 2001/0020293 A1 * | 9/2001 | Uchihira et al. | 717/4 |
| 2002/0062463 A1 * | 5/2002 | Hines | 714/38 |
| 2005/0071825 A1 | 3/2005 | Nagaraj et al. | |
| 2005/0256692 A1 * | 11/2005 | Monin et al. | 703/22 |
| 2006/0129367 A1 | 6/2006 | Mishra et al. | |
| 2008/0301080 A1 * | 12/2008 | Huang et al. | 706/47 |
| 2010/0168875 A1 * | 7/2010 | Hennig et al. | 700/29 |

OTHER PUBLICATIONS

Brad Long, "A method for verifying concurrent Java components based on an analysis of concurrently failers",2005, pp. 1-11.*
Shengyuan Wang et al., "Verification of Concurrent Assembly Programs with a Petri Net based Safety Policy", 2004, pp. 1-13.*
Anita Bateman et al., "Extracting a Petri Net Representation of Java Concurrency", 2002, pp. 1-8.*
Nilabja Roy, "Modeling Software Contention Using Colore Petri Nets", 2004, pp. 1-8.*
Buy, et al., "A Petri-Net-Based Approach to Real-Time Program Analysis", Proceedings of the Seventh International Workshop on Software Specification and Design, Date: Dec. 6-7, 1993, pp. 56-60, IEEE.
Chamillard, et al., "Improving the Accuracy of Petri Net-based Analysis of Concurrent Programs", pp. 1-15.
Shen, et al., "A Petri-Net Based Modeling Approach to Concurrent Software Engineering Tasks", Journal of information science and engineering, Date: 2005, vol. 21, pp. 767-795.

* cited by examiner

*Primary Examiner* — Isaac Tecklu

(57) ABSTRACT

Various technologies and techniques are disclosed for using Petri Nets for diagnostics of concurrent programs. One or more initial traces are obtained from a concurrent program that executed properly. The initial trace is used to create a Petri Net. To generate the Petri Net, unique task identifiers and places of interest are generated, and transitions are added. The resulting Petri Net is stored for later use in differential debugging. A trace is obtained from a later execution of the concurrent program that did not execute properly. The later trace is run against the Petri Net to identify at least one difference. A Petri Net can also be used for model checking of concurrent programs. A model checking process is performed to analyze possible executions in the Petri Net to look for one or more problems. A result of the model checking process is output.

12 Claims, 17 Drawing Sheets

Create thread /call remote method
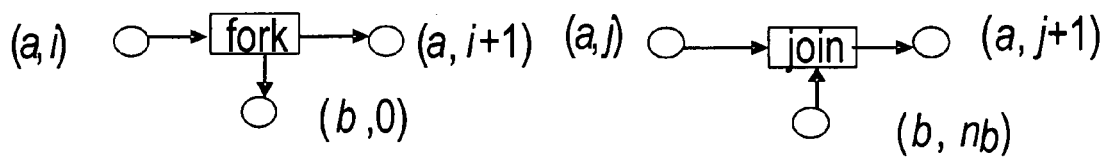
Wait for another thread to finish / return from a remote method
Signal an event / send a message
Wait for the event / receive the message
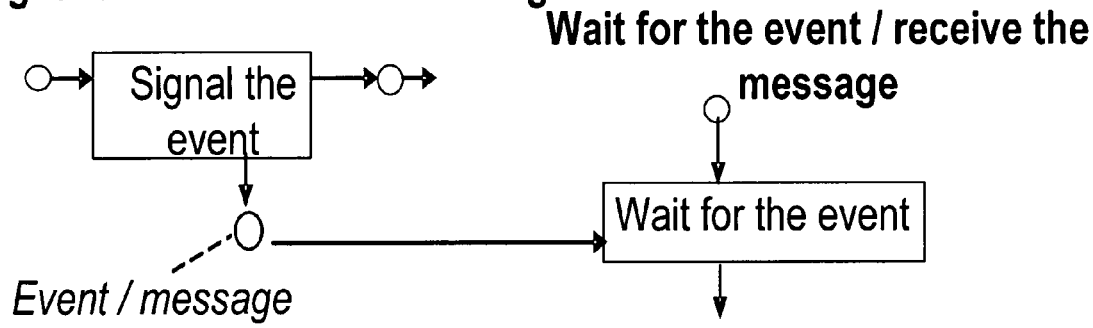
*Event / message*
Init, enter, exit critical section / create, lock, unlock object
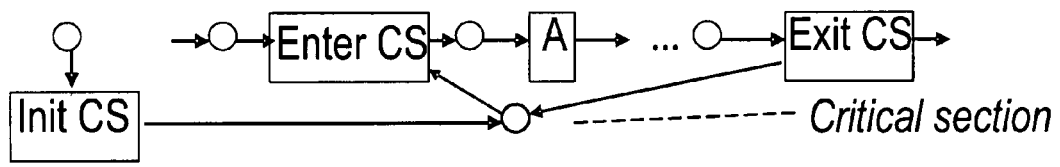
*Critical section*
Semaphore
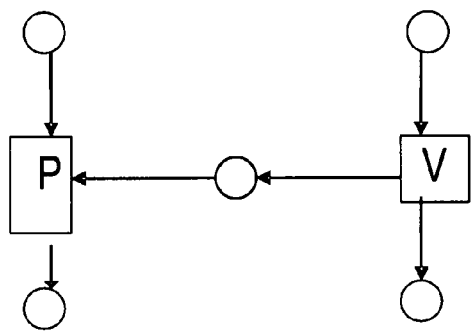
FIG. 4

270

42: "START" (start main thread)
42: "cr.obj." (create object y, set it to 0)
42: "cr.thr. [1]" (create thread [1])
42: "A" (calculate a)
123: "st.thr. [1]" (thread [1] starting)
123: "B" (calculate b)
42: "a.lock [y:1]" (a was calculated, lock y, this was the 1$^{st}$ operation involving y)
42: "a.unlock [y:2]" (a added, y unlocked, this was the 2$^{nd}$ operation involving y)
123: "b.lock [y:3]" (b was calculated, lock y, this was the 3$^{rd}$ operation involving y)
123: "b.unlock [y:4]" (b added, y unlocked, this was the 4$^{th}$ operation involving y)
123: "s.ev. [A]" (set an event to signal to other thread that a is available)
123: "F" (calculate f)
42: "rec.ev [A]" (wait for the event that a is available)
123: "G" (calculate g)
123: "e.thr." (end thread)
42: "join" (waiting for other thread)
42: "END" (end main thread)

FIG. 5

651: "START"
651: "cr.obj."
651: "cr.thr. [1]"
651: "A"
376: "st.thr. [1]"
376: "B"
376: "b.lock [y:1]"
376: "b.unlock [y:2]"
651: "s.ev. [A]"
651: "a.lock [y:3]"
651: "a.unlock [y:4]"
376: "rec.ev [A]"
376: "G"
651: "F"
376: "e.thr."
651: "join"
651: "END"

EXAMPLE USES OF COLORS WITH PETRI NETS FOR DIAGNOSING CONCURRENT PROGRAMS 430

USING A VARIABLE AS A COLOR FOR PASSING DATA BETWEEN THREADS
432

USING A COLOR TO TRACK INTERACTIONS OF A RECURSIVE LOOP
434

USING A COLOR TO STORE A THREAD ID TO IDENTIFY WHICH THREAD IS EXECUTING A GIVEN SECTION
436

USING A COLOR AS AN INDEX OF AN ARRAY TO ALLOW A DYNAMICALLY ALLOCATED ARRAY TO BE REPRESENTED IN THE PETRI NET
438

FIG. 12

```
int f(int n) {
  int r;
  if (n==0) r = 1;
  else r = n*f(n-1);
  return r;
}
```

CONSTRUCTING PETRI NETS FROM TRACES FOR DIAGNOSTICS

BACKGROUND

Software developers create software programs by writing source code using one or more programming languages. The programs that developers use to write the source code are called software development tools. These development tools typically provide various debugging features that allow software developers to inspect how a particular program operates, and to step through the particular program and identify possible defects. When a developer changes a particular program, the change often has unintended consequences and breaks some functionality in another area. The developer can use the manual approach of stepping through the program using a debugger to try and track down the problem by comparing the observed steps to his or her expectations. However, there is also a more automatic approach: If a trace is available from a previous test run that passed the test, and from a run that did not pass the test, then a tool can compare the two traces. If the traced functionality is deterministic, the first difference usually points to the place in the code (or at least close to it) where the change broke the functionality. This method is called differential debugging.

Unfortunately, the differential debugging method does not work when multiple threads or several processes or machines are involved. The traces from different threads/processes interleave in a random way that changes every time, so it is difficult to figure out which difference is due to the different timing and what is the first "real" difference in the functionality.

Also, the testing of concurrent programs is hard in general since the execution is not deterministic, so bugs may occur only under some rare conditions and are hard to reproduce. There are currently two different approaches to this problem. First, a test case can be run a certain number of times. The problem with this approach is that it tends to miss problems that occur with a low probability. A second approach to testing concurrent programs is model checking. Model checking is where the program is modeled and all possible executions are investigated. The problem with model checking is that it is typically only feasible for small programs since the number of possible executions grows exponentially with the number of choices.

SUMMARY

Various technologies and techniques are disclosed for using Petri Nets for diagnostics of concurrent programs. One diagnostic method is differential debugging, which is extended here to concurrent programs. One or several traces are obtained from a program that executed properly. These initial traces are used to create a Petri Net, which is stored for later use in differential debugging. A trace is obtained from a later execution of the concurrent program that did not execute properly. The later trace is run against the Petri Net to identify the first inconsistency, which points to a point in the code which is likely to be at or near the cause of the failure.

Another diagnostic method is Model Checking, which is applied here to traces. A Petri Net is generated from the trace(s) of a concurrent program that executed properly. A model checking process is performed on the Petri Net to analyze possible executions in the Petri Net to look for one or more problems. A result of the model checking process is output.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 details building blocks of a generated Petri Net.

FIG. 5 is a diagram for one implementation of the system of FIG. 1 illustrating an exemplary trace from a program that executed properly.

FIG. 8 is a diagram illustrating an exemplary trace for one implementation from a program that did not execute properly.

FIGS. 12-13 are diagrams of one implementation that illustrate the use of colors with Petri Nets for providing additional information.

FIG. 14 is a diagram for one implementation that illustrates an exemplary function.

DETAILED DESCRIPTION

Figure 1:
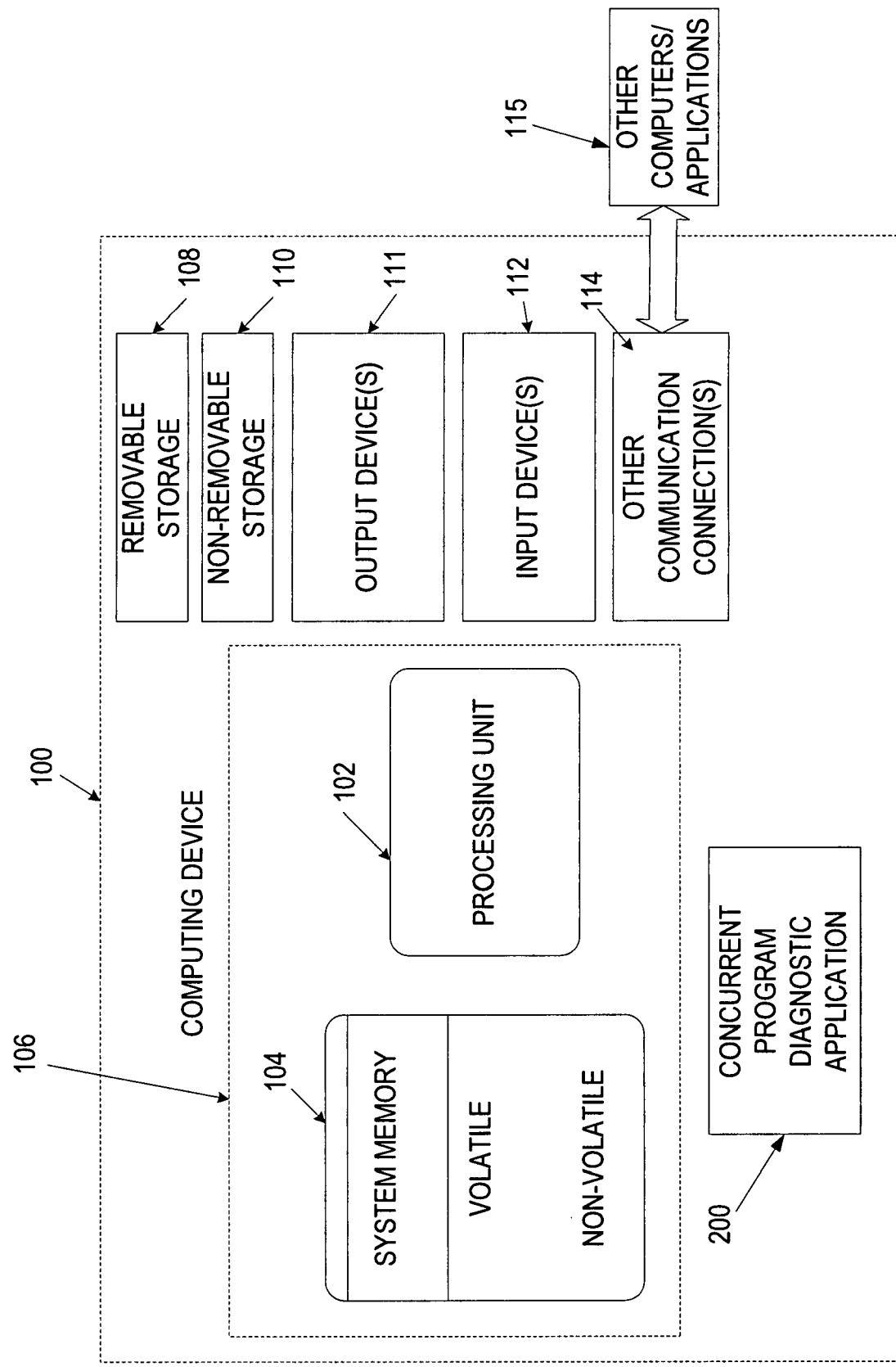
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a diagnostic application for concurrent programs, but the system also serves other purposes in addition to these. In one implementation, one or more of the techniques described herein can be implemented as features within a software development program such as MICROSOFT® Visual Studio, or from any other type of program or service that provides software debugging and/or diagnosis.

In one implementation, a system is provided that generates a Petri Net from one or more traces of a program that executed properly, and then uses the Petri Net to perform differential debugging on another trace from another running of the same program that did not execute properly. In another implementation, the same method is used to generate a Petri Net from the trace of a program, but the Petri Net is then used for model checking of a program. The term "Petri Net" as used herein is meant to consist of the logical structure that models several processes that execute in parallel and can optionally communicate with each other. It does not include the graphical representation.

Petri Nets have "places" and "transitions", each transition has input and output multisets, i.e. the same place can occur several times in the input (or output) of a transition. A "marking" of a Petri Net means assigning a non-negative integer n to each place p, we say the place p has n tokens.

A transition is "enabled" for a marking if there are at least $n_p$ tokens on each input place p which appears with the multiplicity $n_p$ in the input set. Firing an enabled transition means removing $n_p$ tokens from each place p which appears with multiplicity $n_p$ in the input multiset, and then adding $n_q$ tokens to each place q which appears with multiplicity $n_q$ in the output multiset. In general, the same place may appear in both the input multiset and output multiset of the same transition. The Petri Nets used in the following come with an initial marking which corresponds to the start of the program, and with "labels" assigned to the transitions. These labels are elements of a finite set $\Sigma$, which can be considered as an alphabet. Now we consider sequences of transitions $t_0, t_1, \ldots t_n$ such that $t_0$ is enabled for the initial marking, $t_1$ is enabled for the resulting marking after applying $t_0$, $t_2$ is enabled for the resulting marking after applying $t_1$ etc. If we write down the labels of $t_0, t_1, t_2, \ldots t_n$ we get a sequence of labels, which we can consider as a word over the alphabet $\Sigma$. The set of all such words is called the language of this Petri Net (given the initial marking and the assignment of labels to the transition).

These Petri Net languages have been studied in different variations, in particular it makes a difference whether several transitions are allowed to have the same label. In the proposed application of Petri Nets to modeling program behavior from a set of traces, the set $\Sigma$ is the set of possible trace lines, and different transitions are allowed to have the same label. Using some or all of the techniques discussed herein, a Petri Net can be constructed which has as its language the possible traces of the (first, correct) program (in the tested scenario).

Petri Nets can be used to model communication between sequentially executed command sequences. These command sequences can be executed on different threads, in different processes, and on different machines. When talking about "cross-thread communication", the case that the threads are running in different processes or even on different machines is included. Similarly, when talking about "thread id", process id and machine name are included when several processes/machines are involved.

A second generalization of "threads" is used: When thread pooling is used, the operating system reuses the same (operating system) thread for new tasks ("logical threads"). This can be considered as an implementation detail, for the logical structure of the program we should rather consider these "tasks" as the "real" threads. In particular, if the same program is executed several times, we cannot expect to always get the same distribution of the tasks to the available operating system threads. In other words, we will not always get the same partition of the sets of all tasks into subsets of tasks executed on the same operating system thread).

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes concurrent program diagnostic application 200. Concurrent program diagnostic application 200 will be described in further detail in FIG. 2.

Figure 2:
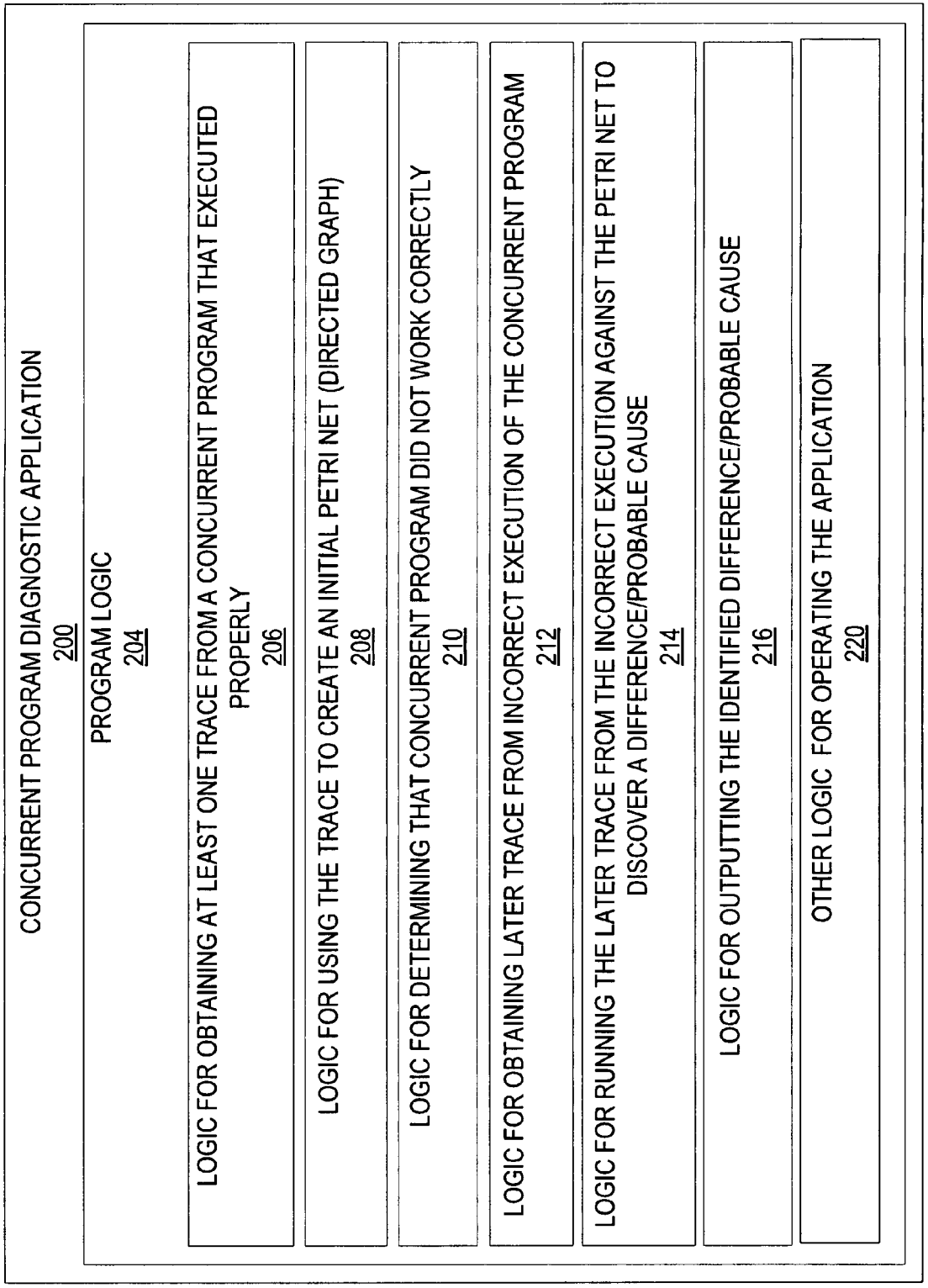
FIG. 2 is a diagrammatic view of a concurrent program diagnostic application of one implementation operating on the computer system of FIG. 1.

Turning now to FIG. 2 with continued reference to FIG. 1, a concurrent program diagnostic application 200 operating on computing device 100 is illustrated. Concurrent program diagnostic application 200 is one of the application programs that reside on computing device 100. However, it will be understood that concurrent program diagnostic application 200 can alternatively or additionally be embodied as computer-executable instructions on one or more computers and/or in different variations than shown on FIG. 1. Alternatively or additionally, one or more parts of concurrent program diagnostic application 200 can be part of system memory 104, on other computers and/or applications 115, or other such variations as would occur to one in the computer software art.

Concurrent program diagnostic application 200 includes program logic 204, which is responsible for carrying out some or all of the techniques described herein. Program logic 204 includes logic for obtaining at least one trace from a concurrent program that executed properly 206; logic for using the trace to create an initial Petri Net (directed graph)

208; logic for determining that the concurrent program did not work correctly 210; logic for obtaining a trace from an incorrect execution of the concurrent program 212; logic for running the trace from the incorrect execution against the Petri Net to discover a difference/probable cause 214; logic for outputting the identified difference/probable cause 216; and other logic for operating the application 220. In one implementation, program logic 204 is operable to be called programmatically from another program, such as using a single call to a procedure in program logic 204.

Figure 3:
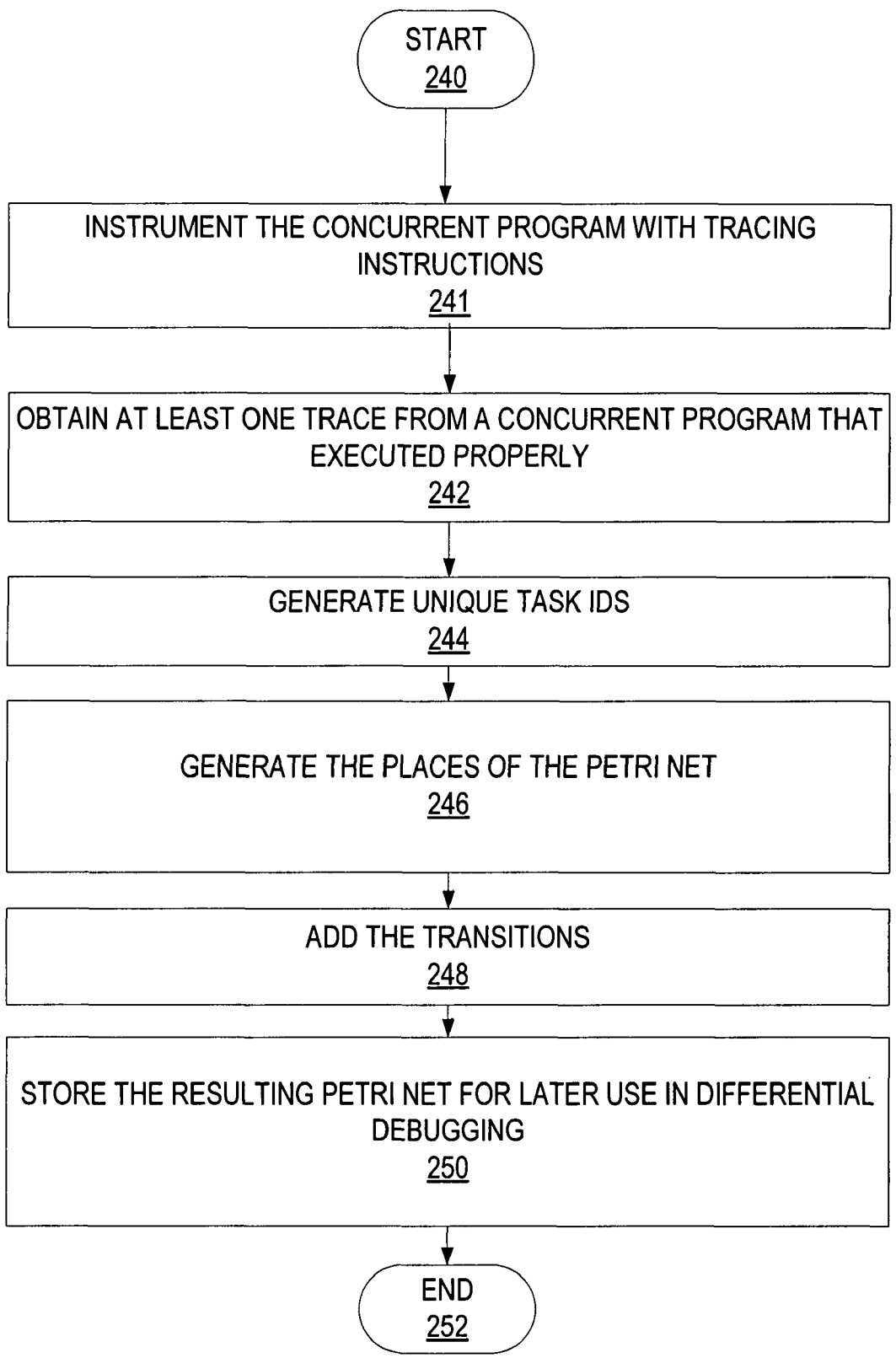
FIG. 3 is a process flow diagram for one implementation of the system of FIG. 1 illustrating the stages involved in generating a Petri Net for use in differential debugging of concurrent programs.
Figure 6:
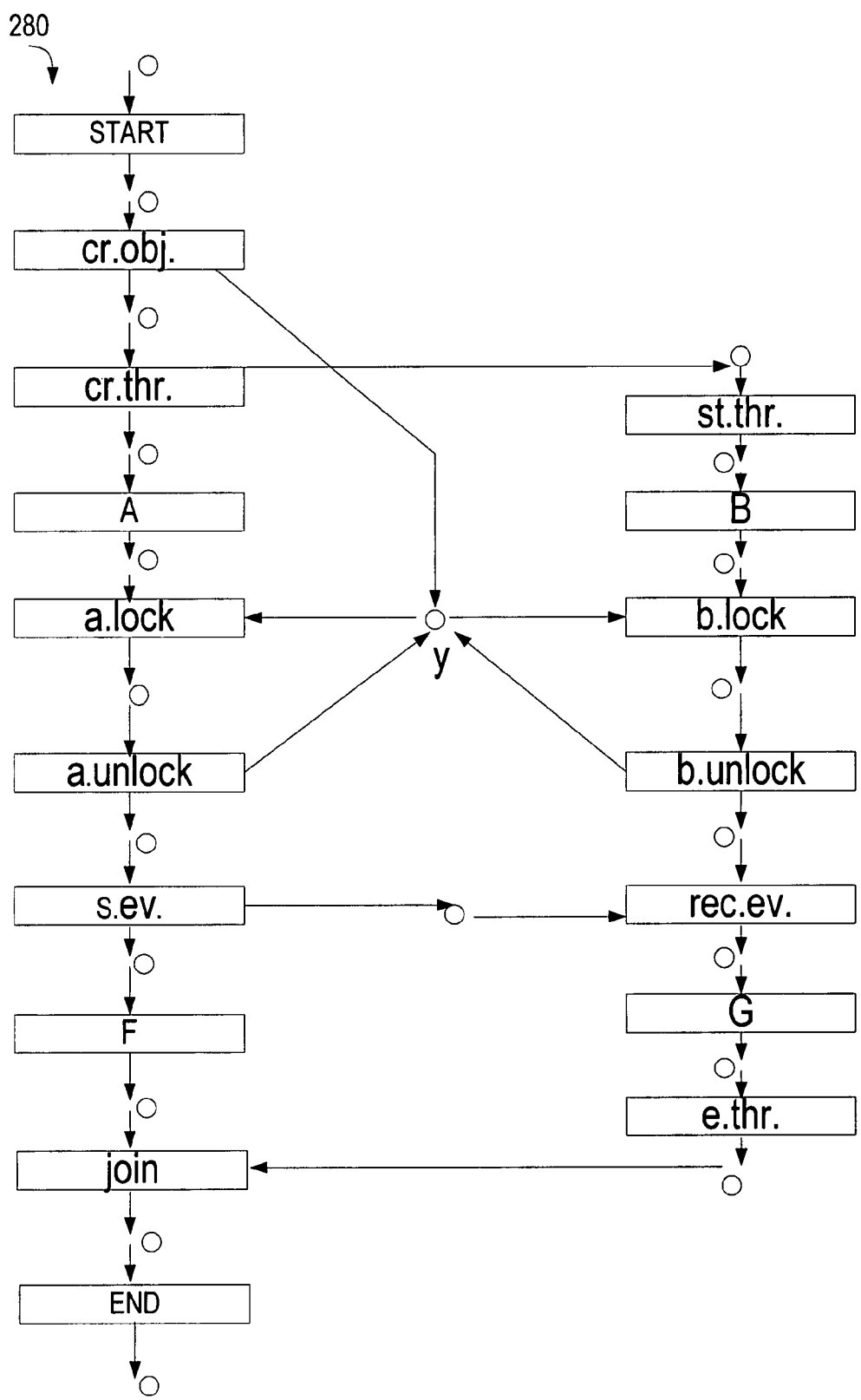
FIG. 6 is a diagram for one implementation of the system of FIG. 1 illustrating an exemplary Petri Net generated from the exemplary trace of FIG. 5.

Turning now to FIGS. 3-17 with continued reference to FIGS. 1-2, the stages for implementing one or more implementations of concurrent program diagnostic application 200 are described in further detail. FIG. 3 illustrates one implementation of the stages involved in generating a Petri Net for use in differential debugging. In one form, the process of FIG. 3 is at least partially implemented in the operating logic of computing device 100. The process begins at start point 240 with the system instrumenting the program with tracing instructions (stage 241). By running the instrumented program, one or several traces are obtained from the original concurrent program that executed properly (stage 242). The system generates unique task ids (stage 244) and the places of the Petri Net (stage 246). The system then adds the transactions (stage 248). The system stores the resulting Petri Net for later use in differential debugging (stage 250). The process ends at end point 252.

These stages from FIG. 3 are now described in further detail using a non-limiting example. The non-limiting example is a special case of investigating the control flow only, where timing is the only source of non-determinism. It is assumed that the input to our program is kept fixed and there are no other influences on the control flow that could vary (e.g. user behavior, system date/time, random number generator using system date/time, content of a database, address of objects allocated on the heap). It is also assumed that a difference in timing does not influence the value of variables which are then influencing the control flow (this could be the case when shared variables are used for synchronization mechanisms). This also excludes filling message buffers with different types of messages which can come from different threads, since in that case the timing influences the order of the entries in the message queue, which in turn influences the execution when the messages are retrieved and different actions are executed. (We will return to this case in the context of Colored Petri Nets below.)

In this special case, as long as the functionality has not changed, the events happening on each thread (or, more general, task, if thread pooling is used) are the same for each execution of the scenario, but the relative speed of execution for different threads may vary, so we may e.g. run into a deadlock in some cases, but not in others.

Returning to how this hypothetical example relates to FIG. 3, the system starts by considering the ways to add tracing to the program (stage 241). In one implementation, the system assumes there is full control over the source code or some other way of inserting tracing instructions at points of interest. The code is instrumented such that cross-thread communication is "sufficiently" traced (to be specified below). As a few non-limiting examples, this can be done:
- by a low level tool which instruments all calls to system primitives
- by replacing libraries/assemblies with instrumented variants
- by creating automatically a source code variant which includes tracing (e.g. by replacing namespaces for concurrency libraries and other schematic modifications of the source code)
- by the user choosing libraries which include the necessary tracing.

We now specify what needs to be traced. The traced events include:
- a "start main thread" and "end main thread" trace line
- thread creation, waiting for thread termination
- on each thread, there is a first "thread starting" trace line and a last "thread terminating" trace line
- on remote/asynchronous method invocation, there are "calling"/"returning from call" traces on the caller thread and a first "task starting" and a last "task ending" trace line on the callee thread.
- locking/unlocking objects
- initializing/entering/leaving critical sections
- setting/clearing/waiting for an event/mutex
- semaphore operations
- sending/receiving messages across threads The trace for each of these events specified above include:
- a unique thread id (and process id/machine name if necessary) for all events
- for events that involve a resource: an id uniquely identifying the resource
  (i.e. the locked/unlocked object, the signaled event/mutex, the entered critical section, the semaphore, the message sent/received)—this must allow tying together commands from different threads that access the same resource.
- to simplify things, we will also assume that for each event involving a resource we have a counter attached to that resource that gets incremented whenever an event involving this resource is traced, and the trace contains the value of this counter. This allows reconstructing the order in which events from different threads accessed this resource.
- for thread creation: an id that uniquely identifies the creation command on the "old" thread and ties it to the correct thread start entry on the "new" thread.
- for remote/asynchronous method invocation: an id that uniquely identifies the call command on the caller thread and ties it to the "task starting" entry on the callee thread, and similarly ties the last entry on the callee thread to the "return from call" entry on the caller thread.

In addition to these necessary traces, the user may add traces to mark milestones in the program. For the moment we will assume this is only the information about the location in the program that has been reached, we do not trace other state information like the value of variables/parameters. This assumption means that these values would always be the same when we run the scenario several times, or at least differences in their values would not influence the control flow of the program. Below we will add tracing of variable values.

For each thread id, assume that the traced events happened in the same order as they are logged. Nothing is assumed about whether the entry into the log occurred before or after the logged activity.

These traces are assembled in one log, and initially no assumptions are made on how the traces coming from different threads are interleaved in the resulting log (e.g. the log may be just the concatenation of the logs for the different thread ids); however, the assumption about the counter on each resource means that there is additional order information, and before the trace is used for differential debugging, the entries will be ordered so that events involving the same resource are in the correct order. (The true order in time had this property, so we will always be able to find at least one such order. In general we do not have enough information to reconstruct the true order, and we do not need it. For an algorithm which finds one possible total order define a graph with the events as vertices, and add an arrow pointing from the earlier to the later event whenever events happened on the same thread or involve the same resource. This defines a directed acyclic graph; the standard "topological sort" algorithm then gives a possible total order for the events.)

Turning now to the construction of the Petri Net from such a trace, the system generates unique task ids (stage 244). One reason for introducing task ids is that a thread may have been terminated and a new thread has been started which happened to get the same thread id. We need to distinguish the log entries corresponding to these two threads—otherwise we would contend that the second thread always has to get the same thread id, which probably is wrong. Also we would contend that the order of these two thread executions is fixed—but it is not if they were started from different and unrelated threads.

So whenever a new thread is started, the system assigns a new task id to it.

A similar case is remote/asynchronous method invocation: The actual thread on which the remote/asynchronous method is executed is usually not important, so the system assigns it a new task id independent from the thread id. We return to the old task id once we have finished the message call. This can be nested: If from thread A, a method b on thread B is called which calls back to a method a2 on thread A which calls a method c on thread C, then returning from this method has two points in thread A to return to, so we would like to distinguish these two. Nesting the above behavior gives us for the entries on thread A: We start with a task id ta1, after we call b and get back with a new method a2, so we mark the next entries with a new task id ta2; after calling c the next entries of thread A still have the task id ta2, after returning to B and returning from B we are back to the previous task id ta1.

Next, the system generate the places of the Petri Net (stage 246): In this example, there will be "process places" and "resource places". For each task id a which has $n_a$ entries in the log, the system creates $n_a+1$ process places which we enumerate as (a,0), (a,1), ... ,(a, $n_a$). For each resource id we add an additional "resource place".

The third step (stage 248) adds the transitions: If an entry with name msg is the i-th entry of task id a, the system adds it as a transition with label msg and input place (a,i−1) and output place (a, i). If it creates a thread or task with task id b, the system adds an output to the place (b,0). If it waits for the thread/task with task id b to finish, the system adds an input from the place (b, $n_b$). If it involves resources, the system adds input and/or output to these resource places to this transition. FIG. 4 shows examples 260 for such transitions corresponding to common constructs for concurrent programming.

FIG. 5 is a diagram 270 for one implementation that illustrates an exemplary trace from a program that executed properly. The example program uses quantities a and b, which can be calculated independently of each other from input x, and then computes y as a+b+f(a)+g(a,b) where again the calculation of f and g is independent of each other. It uses two threads, calculating a and f on the first thread, and b and g on the second thread. An exemplary Petri Net 280 that is generated from the trace of FIG. 5 is then shown in FIG. 6.

Figure 7:
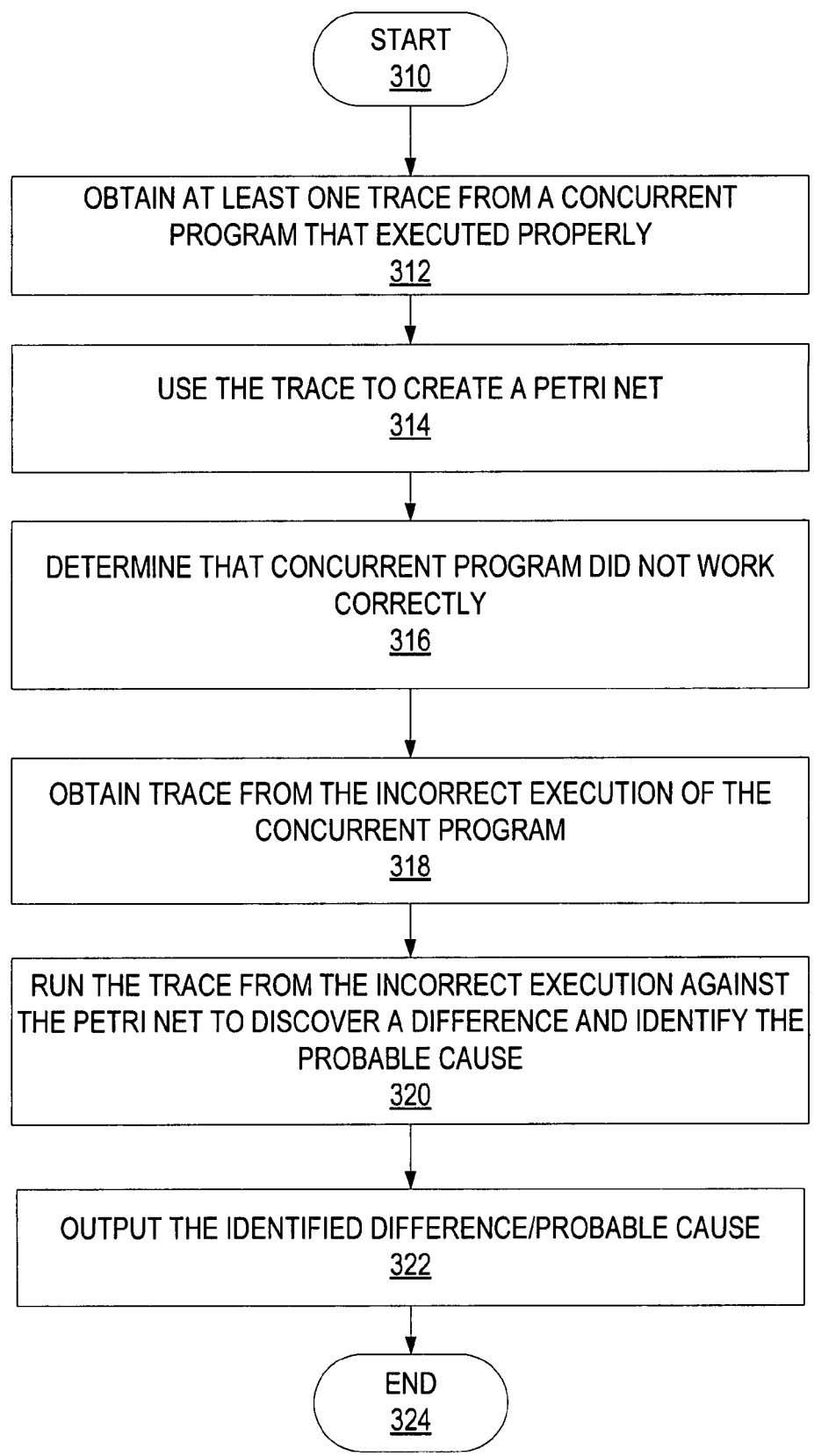
FIG. 7 is a process flow diagram for one implementation of the system of FIG. 1 illustrating the stages involved in using a Petri Net for differential debugging of concurrent programs.

Now that various techniques for generating Petri Nets have been described, let's turn now to a discussion on how to apply such Petri Nets to differential debugging. FIG. 7 illustrates one implementation of the stages involved in using a Petri Net for differential debugging of concurrent programs. In one form, the process of FIG. 7 is at least partially implemented in the operating logic of computing device 100. The process begins at start point 310 with obtaining at least one trace from a concurrent program that executed properly some test/scenario (stage 312). The trace is used to create an initial Petri Net (stage 314). At some point, a change happens in the program that affects the functionality used in this test/scenario. It is determined that the program no longer works correctly (stage 316). This will typically be determined by the user, but it could also be determined programmatically, such as from a failed test run (stage 316). A trace is obtained from the execution of the concurrent program that did not execute correctly (e.g. as expected) (stage 318). The system runs the trace from the incorrect execution against the Petri Net to discover a difference and identify the probable cause (stage 320). The system outputs the identified difference/probable cause (e.g. displays to the user or logs in a file) (stage 322). The process ends at end point 324.

Prior discussions illustrated how to create the Petri Net (stage 314), so at this point, the discussion will focus on further explaining how to run a new trace against the Petri Net (stage 320). The system starts with one token on the initial place of the Petri Net (the one before the "start main thread" transition), and then for each line in the trace, the system tries to fire a transition with the label as given in the trace line which has as input place a process place with the correct task id. During this process, the system has to match the thread ids in the new trace with the task ids in the Petri Net. At the start of the main thread and every time a transition introduces a new task id, the system notes the matching thread id in the trace. If the system cannot find a transition with the correct label and task id, an inconsistency has been found. This first inconsistency usually points to the part of the code where the change in the program affected the tested functionality.

FIG. 8 is a diagram illustrating an exemplary trace for one implementation from a program that did not execute properly. Upon running this trace against the Petri Net of FIG. 6, the system can determine that the line with thread id 651 and message "s.ev. [A]" is the first one inconsistent with the Petri Net: The corresponding transition cannot fire because the input place is empty (there are tokens only at the output place of "A" and at the place "y"). This means some change affected the functionality of this test/program at or around the code for "s.ev.". The call used to be to a.lock and a.unlock before s.ev, now it is the other way round, although these steps occur on the same thread.

Figure 9:
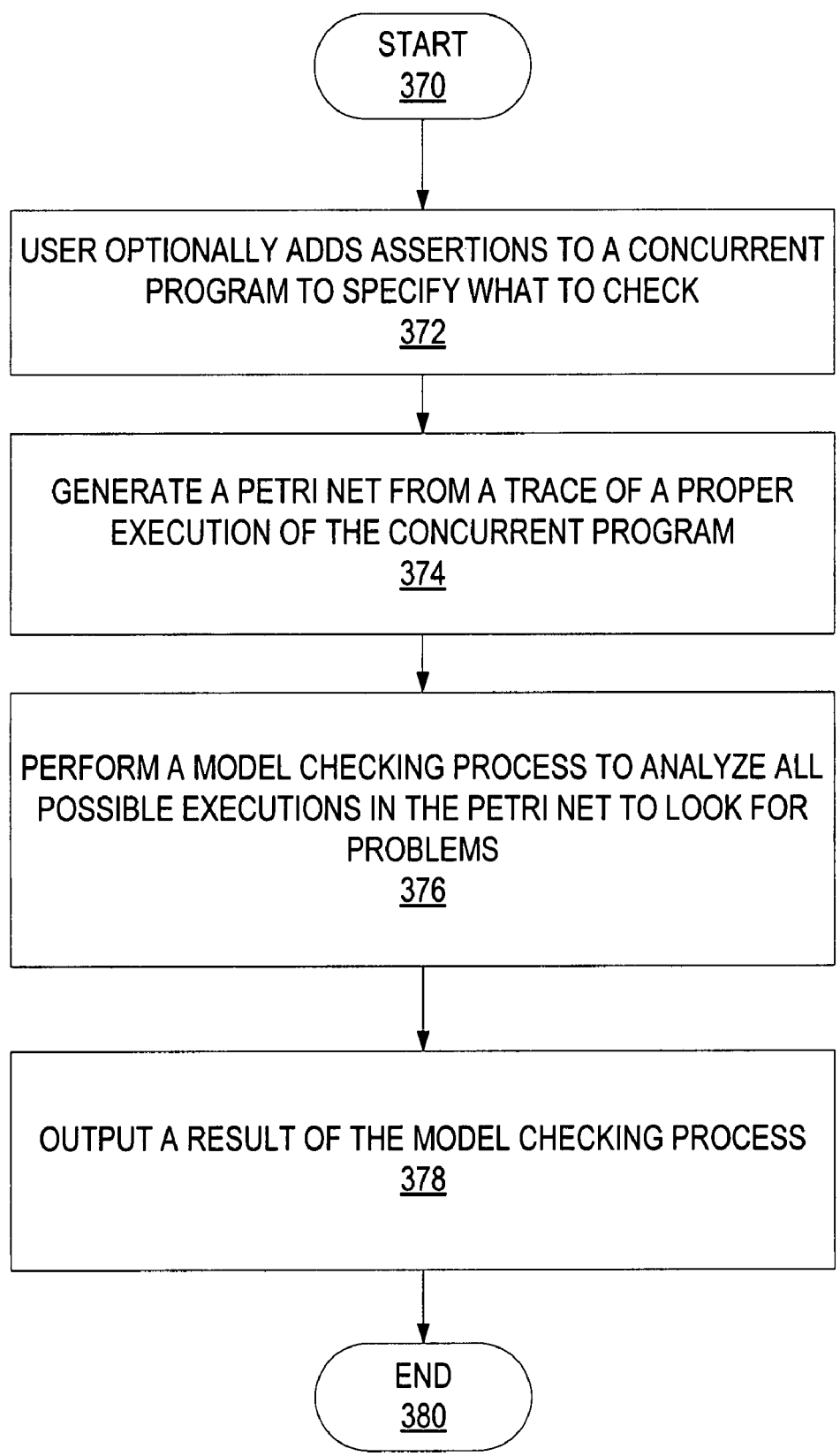
FIG. 9 is a process flow diagram for one implementation that illustrates the stages involved in performing model checks using Petri Nets.

FIG. 9 illustrates one implementation of the stages involved in performing model checks using Petri Nets. In one form, the process of FIG. 9 is at least partially implemented in the operating logic of computing device 100. The process begins at start point 370 with the user optionally adding assertions to an original concurrent program to specify what to check for (stage 372). The system generates a Petri Net from a trace of a proper execution of a concurrent program (stage 374). The system performs a model checking process to analyze all possible executions in the Petri Net to look for problems (e.g. potential deadlocks, whether all necessary parts of the program are executed, test any specified user assertions, etc.) (stage 376). The system outputs the results of the model checking process (e.g. displays any potential problems to user or logs them) (stage 378). The process ends at end point 380.

This model derived from a trace is much smaller than a full model of the program (and hence is much easier to run through a model checker) for the following reasons:

it only models the code used in this particular test, it uses only one fixed input, thus the data are fixed and no choices based on data have to be considered it omits details even in the execution path that it models, only the things that are important for the interaction between threads (and that the tool has traced) are considered. This model will be small enough to allow model checking, i.e. reasoning about all possible execution paths. Thus it is possible to find bugs like deadlocks from a test run, even if the bug did not manifest itself in the test run.

The possible user assertions in the special case considered so far are very limited since we did not yet include the value of variables (this is described next), but checking for deadlocks already makes sense, and one type of assertions which is possible even at this level is that a particular lock is available or taken at a particular point.

Let's now turn to the more general case of using Colored Petri Nets to model a control flow that interacts with variable values. Both differential debugging and Model Checking of traces can be extended to that more general context. We start by recalling the notion of Colored Petri Nets. In Colored Petri Nets the "tokens" get "colors", which are data of a type ("color set") which is determined by the place. Each transition gets parameters of a certain type, and the input and output of the transition depends on these parameters. For example, a transition could depend on two integer parameters x and y, take a token of color x from one input place and a token of color y from a second input place, and put a token of color x+y on an output place. Additionally, transitions can get a precondition—this is a Boolean expression in the parameters, and a transition is only enabled if the precondition evaluates to true.

The term "color" is standard terminology, although it may evoke the wrong connotations: Colors are the standard example of enumerations, but the additional data of the tokens can be of any other type, too (numeric, string, complex types). Thus, the term "color" has become a standard way of referring to all of additional types of data, and is the definition intended by the use of the term herein.

In the following we assume there is a set of variables (which we will trace) such that:

At any point in the program/test scenario the value of such a variable only depends on the values of the other traced variables and on the timing/control flow, and not on other non-deterministic values like system time. (If it is e.g. a generated GUID, it must be specified that the value itself is not to be used, but only whether two values agree, see above. In that case the value can still be considered "deterministic" because all decisions based on such values are deterministic)

The control flow in a given test scenario only depends on the timing and these values (not on other not traced variables).

The variables are only involved in simple operations like

Set to constant, set to other variable value (for a traced variable of the same type)

Compare to constant, compare to other variable,

Store in stack/queue

Integer arithmetic (This list can be expanded, but the differential debugging and model checking algorithms have to be prepared to handle these operations)

In the example of messages of different type being filled into one message queue, the variable would be the type of the message, its type would be an enumeration (or an integer), it would be set when the message is sent, and compared to constants when the message is read and the corresponding action is executed.

In general, it is expected only a few variables will need to be traced in this way since most variables/computations will be fixed by the assumption of given input values and not participate in synchronization between threads.

These conditions guarantee that the resulting Colored Petri Net will model exactly the possible control flows, which is important in particular for Model Checking.

While most programs will fit these criteria, in some cases this may not be the case or the necessary amount of tracing may be prohibitive. In those cases, differential debugging is still possible and useful with a smaller set of variables which do not meet this requirement, the only change necessary would be that we trace at some places "variable v changed to value x" in which the value x would not be checked, i.e. which would be consistent with the Colored Petri Net for any value of x, but which may enable the system later to find an inconsistency based on the traced value of x.

For Model Checking, a similar approach is conceivable, but seems less attractive since this could drastically increase the set of possible traces and furthermore failing to exclude an impossible trace can lead to false error messages.

Figure 10:
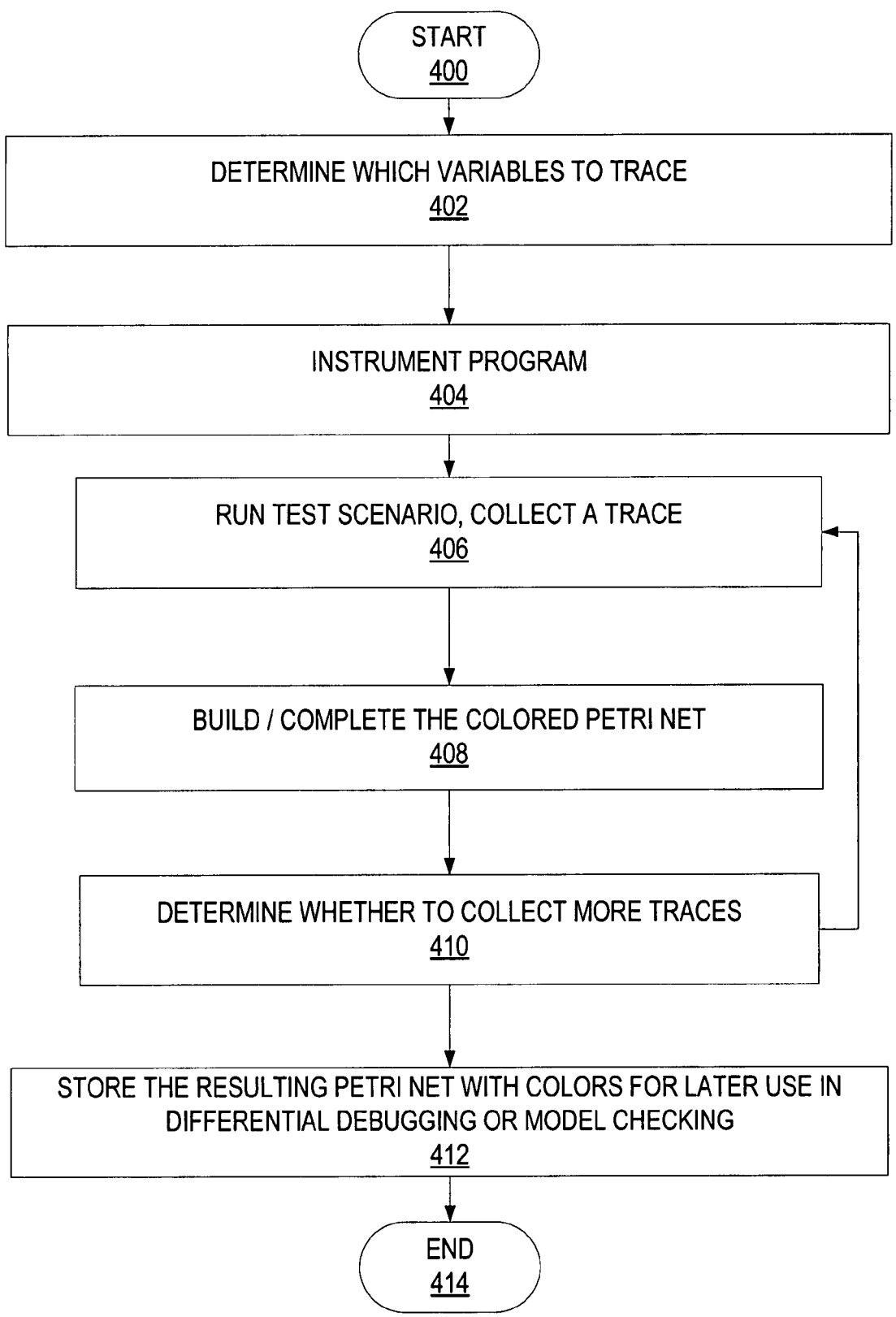
FIG. 10 is a process flow diagram for one implementation that illustrates the stages involved in generating a Colored Petri Net for use in diagnosing concurrent programs.

FIG. 10 illustrates one implementation of the stages involved in generating a Colored Petri Net for use in differential debugging or Model Checking. In one form, the process of FIG. 10 is at least partially implemented in the operating logic of computing device 100. The process begins at start point 400 with the system or user determining which variables to trace (stage 402). The program is instrumented (stage 404), and run to collect a trace (stage 406). Then the Colored Petri Net is built up (if this was the first iteration) or enhanced (in the next iterations) (stage 408), until it is decided we have enough information and the Petri Net is complete (stage 410). The system stores the resulting Colored Petri Net for later use in differential debugging or Model Checking (stage 412). The process ends at end point 414.

Let's now look at each of these stages in further detail. The process starts with stage 402 by determining which variables to trace. In one implementation (which would be the easiest to realize), tracing is automatically added (including values of internally used variables) for higher level synchronization mechanisms (like the message queue example mentioned above) and otherwise the user is asked to mark variables which we need to trace. In a variant of this implementation, the system can support the user by comparing different traces of the same scenario: When a Petri Net model is constructed from the first run, the same test case is run again, and a resulting trace is found that doesn't fit the Petri Net model of the first run, the first difference can be shown. This will point to the first piece of code which is not deterministic, so a user familiar with the code can probably spot easily which variable (s) to add to make this behavior deterministic.

In another implementation, a more comprehensive solution could determine automatically the smallest set needed (or at least a reasonably small set) of variables which satisfy the above requirements.

The instrumentation of the program (stage 404) adds tracing statements in a similar way as in the case of a "plain" Petri Net, but now we also trace the values of the specified variables whenever they change or when they influence the control flow:

Tracing variable values: Whenever a value is modified, the system traces this fact and specifies the operation. For example, if it is set to a constant, the system needs to trace the constant; if it is increased by one, the system only needs to trace that it is increased by one, etc. (The operation does not really have to be physically noted in the trace, the system just needs to be able to infer it from the trace. For example, the system can just trace the location in the code and keep a database with the trace lines and which operations they correspond to.) If it is a shared variable (i.e. accessed from different threads), we also need to trace it whenever we read it. As with other resources, the system adds a counter to the structure that guards the variable, increase it every time the variable is accessed, and log the counter value together with the variable value. This way, the variable accesses can be ordered from different threads. (It is not necessary to record the value at read access, since it can be inferred from the last value at write access.)

Tracing branches (if, switch, and loop constructs): When the control flow depends on one or more of the traced variables, the system has to trace these variables.

Whenever traced variables are used in an index expression for a resource (e.g. an object in an array which is going to be locked), the system now also records these variables as part of the trace line which traces the locking operation.

Similarly, whenever messages are exchanged between threads that contain traced variables, the system traces the value of these variables as part of the trace line that traces that message's send/receive operations.

When a function call happens, the system also traces the value of function parameters if they depend on traced variables (as always, this information does not have to be present in the actual trace if the system can infer it).

Let's turn now to an example of building a Colored Petri Net (stage 408). When using Colored Petri Nets to model traces, the transition depending on parameters corresponds to a trace instruction which also traces the values of certain variables. In one implementation, these variables correspond to a subset of the parameters of the transition such that the values of all transition parameters are determined by the traced variables and the color of the input tokens.

Tracing only a subset of parameters of the transition is only an optimization: In another implementation, the system could trace all variables that correspond to parameters of the transition, but usually this is not needed. For example, if we want to keep track of the values of the local variables a and b, then a statement that assigns a value to a does not need to trace b. In fact, if the change to a is deterministic, e.g. incrementing a by one, we do not even have to trace the value of a.

Figure 11:
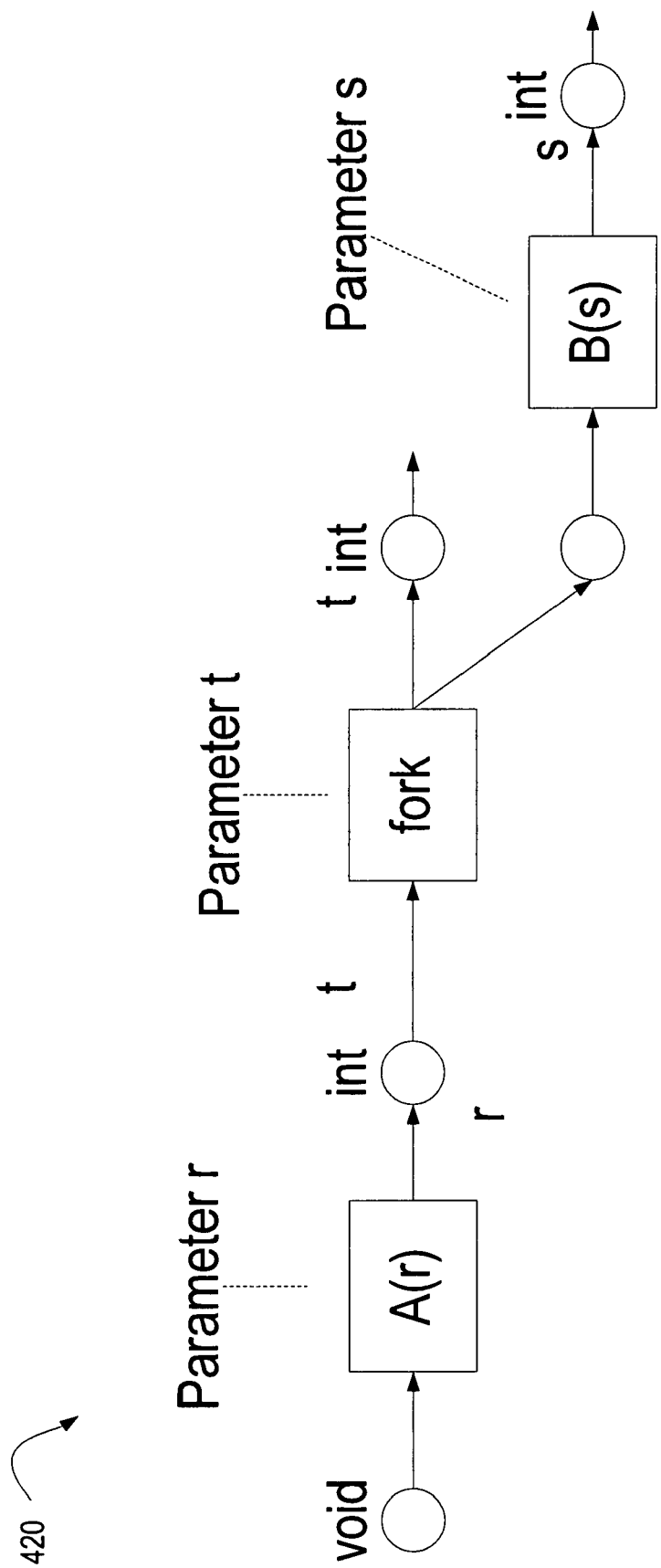
FIG. 11 is a diagram for one implementation of the system of FIG. 1 illustrating some exemplary uses of colors with Petri Nets for differential debugging.

FIG. 11 gives an example of a diagram 420 for a Colored Petri Net. The system has added the type ("color set") of tokens for each place, and for each transition has added the parameters that are used in the transition. In the box for the transitions, the traced parameters are added in parentheses to the label of the transition. The transitions "A" and "B" use one int parameter, which is traced; the transition "fork" uses one int parameter t which is not traced (but can be inferred from the color of the input token.)

FIG. 12 is a diagram for one implementation of the system of FIG. 1 illustrating some exemplary uses of Colored Petri Nets for diagnosing concurrent programs 430. A color can be a variable that is used for passing data between threads 432. A color can be used to track iterations of a recursive loop 434. A color can be used to store a thread identifier to identify which thread is executing a given section 436. A color can be used as an index of an array to allow a dynamically allocated array to be represented in the Petri Net 438. These are just a few non-limiting examples of how colors may be used with Petri Nets for providing additional information that may be useful for diagnosing concurrent programs.

The Colored Petri Net is basically constructed in the same way as the "plain" Petri Net above, but now we have to add the parameters, the way the color of input/output tokens depend on the parameters, and we have additional constructs for branching which depends on non-deterministic variables. The Colored Petri Net constructs for if/switch/loops are obvious (we have to add the precondition), but care must be taken at these points when we construct the Petri Net from several traces which e.g. go through different branches of an if . . . else . . . statement that we recognize the point where both branches come together again and we should switch from adding new transitions for the code in a previously not modeled branch to checking that the trace is consistent with the existing Petri Net. The use of colors allows now some simplifications in the Petri Net model, which are in turn necessary when things depend on a non-deterministic traced variable:

Instead of using different process places corresponding to different threads being at the same trace line in the code, we now use the same process place and add the task-id (thread/process/machine-id) as a color to the token. This becomes necessary when a variable number of threads are created and accessed e.g. by an index. In that case we add the index as a color to the token.

Instead of using different process places for the same trace line in a function that is called recursively several times, we add the stack-depth as an integer color to the token. This becomes necessary when the recursion depth depends on a non-deterministic traced variable (see below for an example).

Instead of using different resource places for locked objects in an array (or, more generally, objects that are accessed by parameters), we use the same resource place and add the index (or parameters in general) to the color of the token on this place. This becomes necessary if the object accessed is indexed by a non-deterministic traced variable.

Instead of using different resource places for different messages that are sent/received by the same line of code with different message contents, we only use one resource place and add the message content as color to the token. This becomes necessary if the message content depends on a non-deterministic traced variable.

Figure 13:
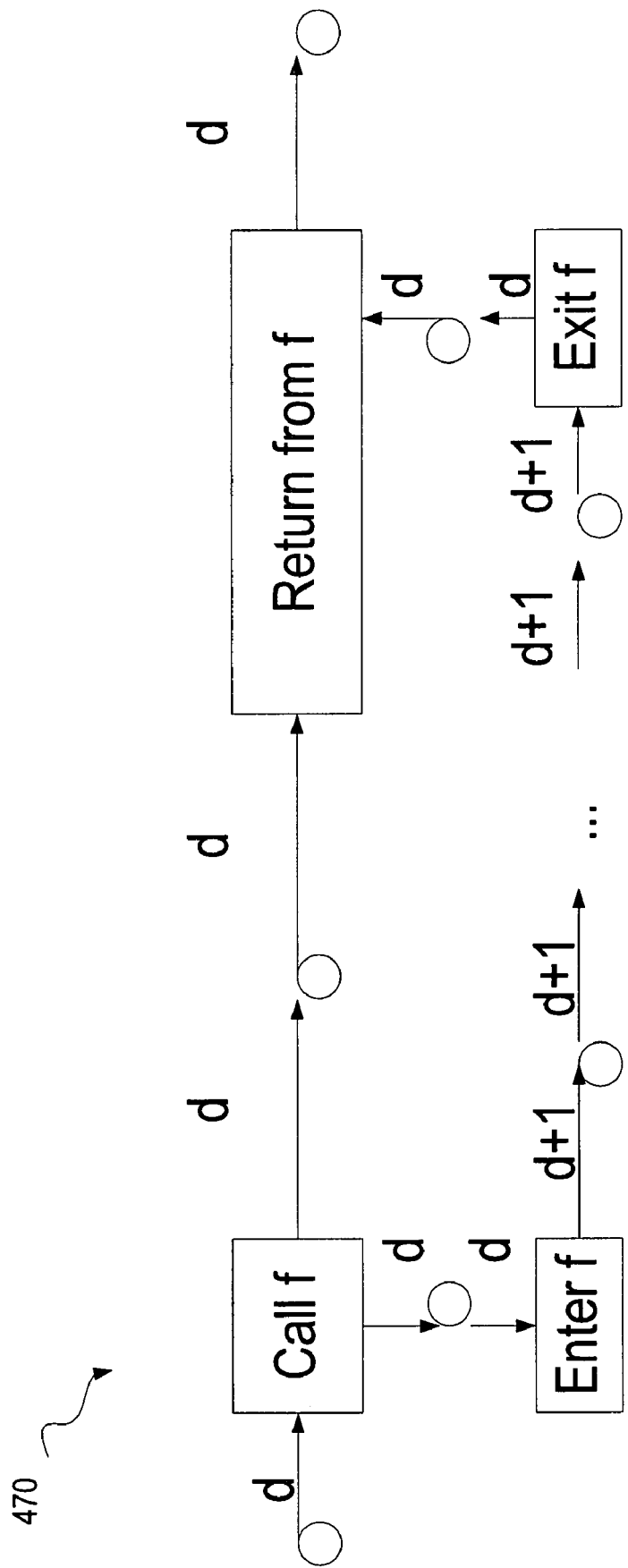

The example Colored Petri Net 470 of FIG. 13 illustrates an exemplary invocation of a particular method (called f in the figure). Since the "Return from f" now only accepts tokens with the correct stack depth, this works well for recursive functions.

Figure 15:
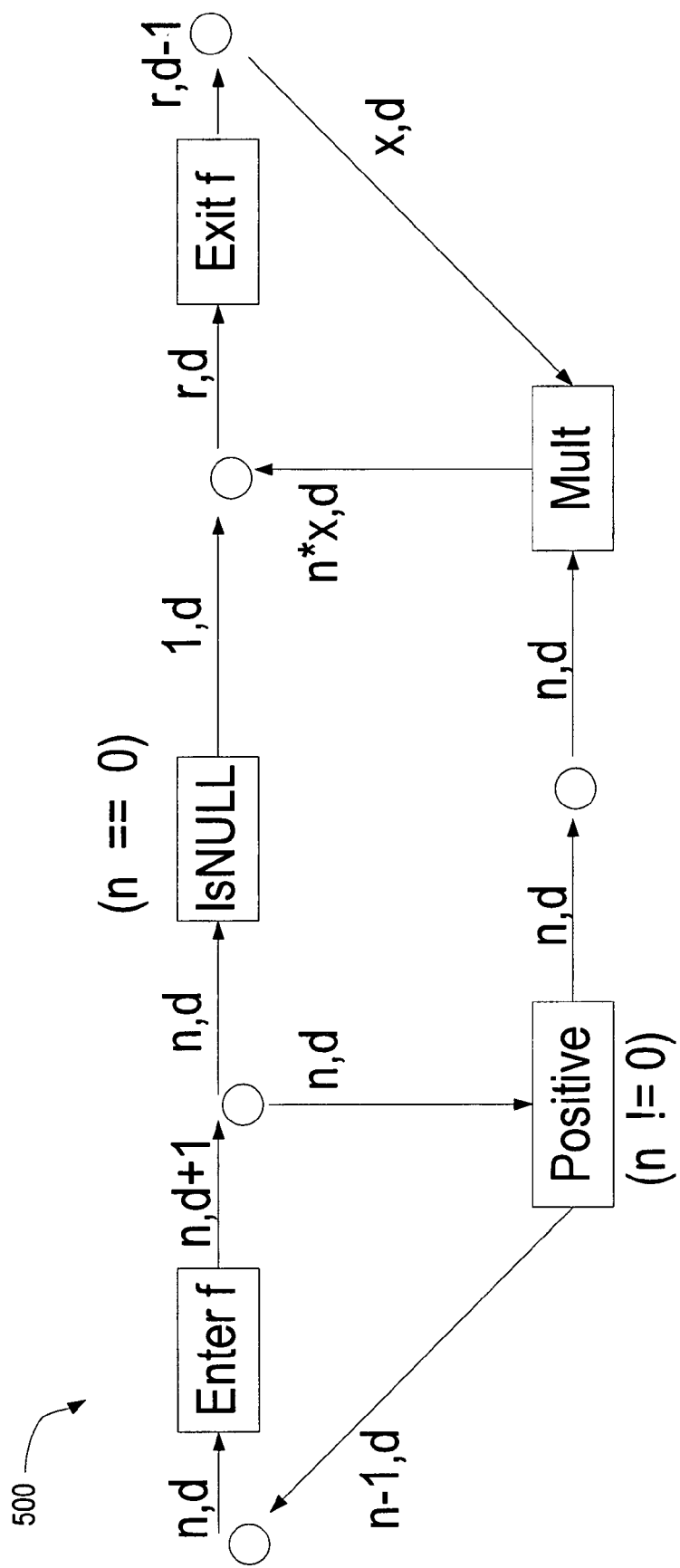
FIG. 15 is a diagram for one implementation that illustrates how the exemplary function of FIG. 14 could be represented in a Colored Petri Net.

FIG. 14 is a diagram 490 for one implementation that illustrates an exemplary function. FIG. 15 illustrates a corresponding Colored Petri Net 500 for this function. This exemplary function happens to compute a factorial function, but is just provided to give further details on how Colored Petri Nets can operate for use in diagnostics of concurrent programs. Executing this Petri Net with input (n,d) will run through the left triangle n times and when the transition "Positive" is executed for the k-th time, it produces an additional token (n+1−k, d+k) in the lower middle place. So after n iterations there are n tokens (n,d+1), (n−1,d+2), . . . (1,d+n) in the lower middle place, (they can be seen as n interrupted executions, corresponding to n entries on the stack). Then IsNull is executed and then the n tokens are used up by running through the right triangle n times in the following way: When the system exits f for the k-th time, a token with color (k!, d+n−k) is provided on the rightmost place.

As long as the depth does not match the initial depth, the token cannot be collected by the (not depicted) "Return from f" transition. Instead the token is collected by executing Mult, which takes the token with color (k!, d+n−k) from the right and the token with matching depth from the left, which is (k+1, d+n−k), and multiplies k! with k+1 to give the next result. When all tokens are gone from the lower middle place, a token with color (n!, d) is output in the rightmost place, which then can be collected from the code which called the function f.

After building or completing the Petri Net, the system has to determine whether the Petri Net is complete or whether more traces need to be collected (stage 410 in FIG. 10). The simplest solution would be to just run the test scenario a fixed number $n_1$ of times and then repeat running the scenario until the last $n_2$ traces did not add new paths to the Petri Net and then assume all "common" paths (or all paths of practical importance) have been covered. A somewhat better solution could also add randomized Sleep() statements at the points that are already instrumented for tracing—this will add execution paths that otherwise would only be taken with low probability.

A comprehensive solution could use model checking to either prove that all possible paths have been covered, or find a path that leads to a branch which has not been taken in one direction; then this path could be explored by "controlled re-execution" by stopping/activating the appropriate threads in the given order and hence a new path would be added to the Petri Net. By repeating this process the system would eventually find all elements of the Petri Net. Note that it is not necessary to execute and trace all possible execution paths (this number would be exponential in the number of branches), it is only necessary to go through each branch at least once in each direction (for branches and directions that actually can appear in the test scenario), this number of traces is linear in the number of branches.

In practice, it is expected that most programs will only have very few (if any) branches which depend on variables which in turn depend on the timing.

A solution based on the simple heuristic to find all "common" paths/elements of the Petri Net can also be combined with differential debugging and "controlled re-execution" to avoid the cost of Model Checking that the comprehensive solution has: If the old version of the program is available, and a trace of the new program runs along a path that was not explored before, the controlled re-execution can be used on the old program to explore the corresponding path and complete the Petri Net as necessary. While this would be good enough if Differential Debugging alone is to be implemented, this does not solve the problem to construct the full Petri Net of the trace for Model Checking.

Figure 16:
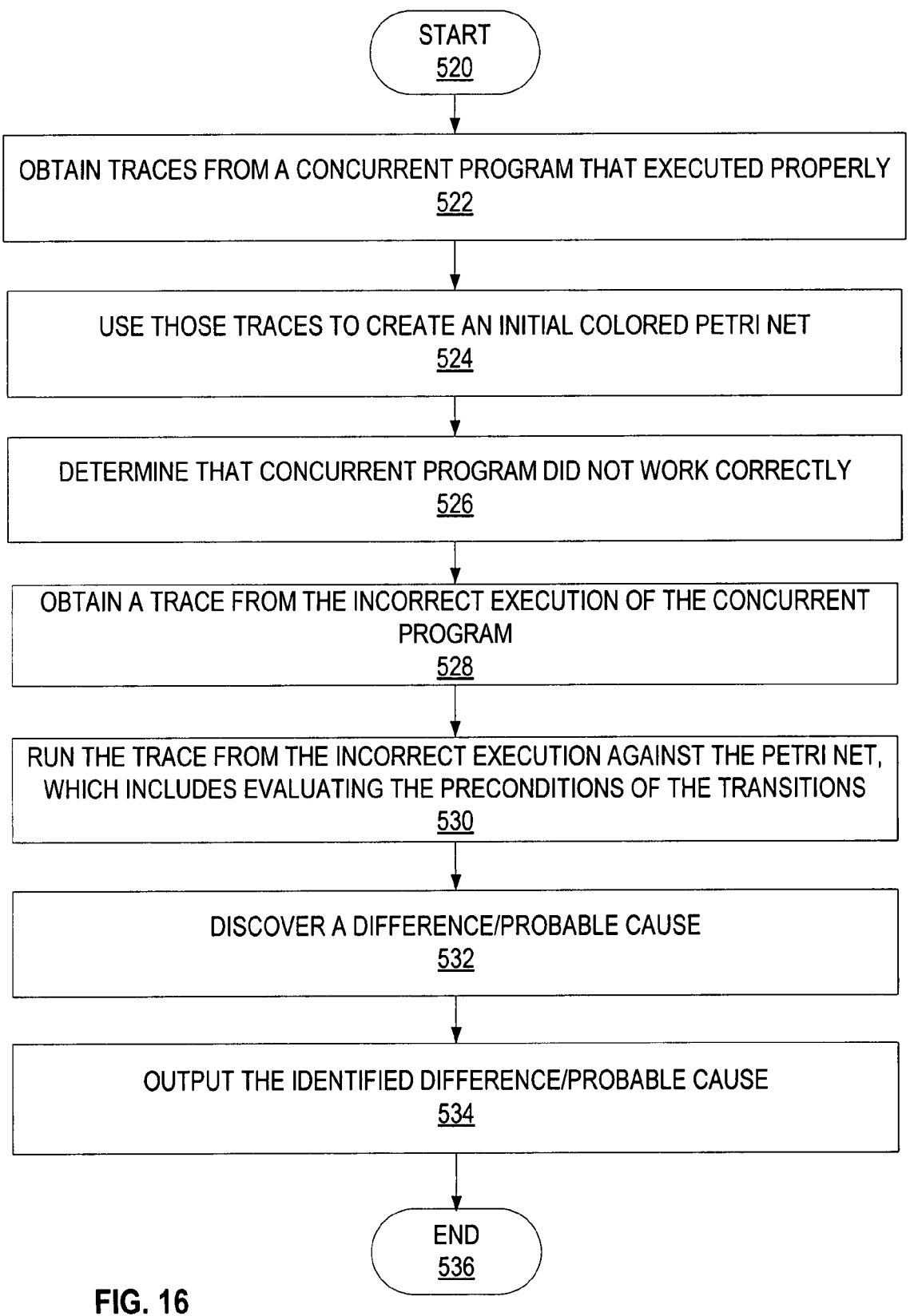
FIG. 16 is a process flow diagram for one implementation of the system of FIG. 1 illustrating the stages involved in using a Colored Petri Net for differential debugging of concurrent programs.

Turning now to FIG. 16, one implementation of the stages involved in using a Colored Petri Net for differential debugging of concurrent programs is illustrated. In one form, the process of FIG. 16 is at least partially implemented in the operating logic of computing device 100. The process begins at start point 520 with obtaining at least one trace from a concurrent program that executed properly (stage 522). The system uses those traces to create a Colored Petri Net (stage 524). The system determines that the concurrent program did not work correctly (e.g. by a user or programmatically) (stage 526). The system obtains a trace from the incorrect execution of the original concurrent program (stage 528). The system runs the trace from the incorrect execution against the Colored Petri Net, which includes evaluating the preconditions of the transitions (stage 530). A difference/probable cause is then identified (stage 532). The system outputs the identified difference/probable cause (e.g. display to user or log in file) (stage 534). The process ends at end point 536.

Figure 17:
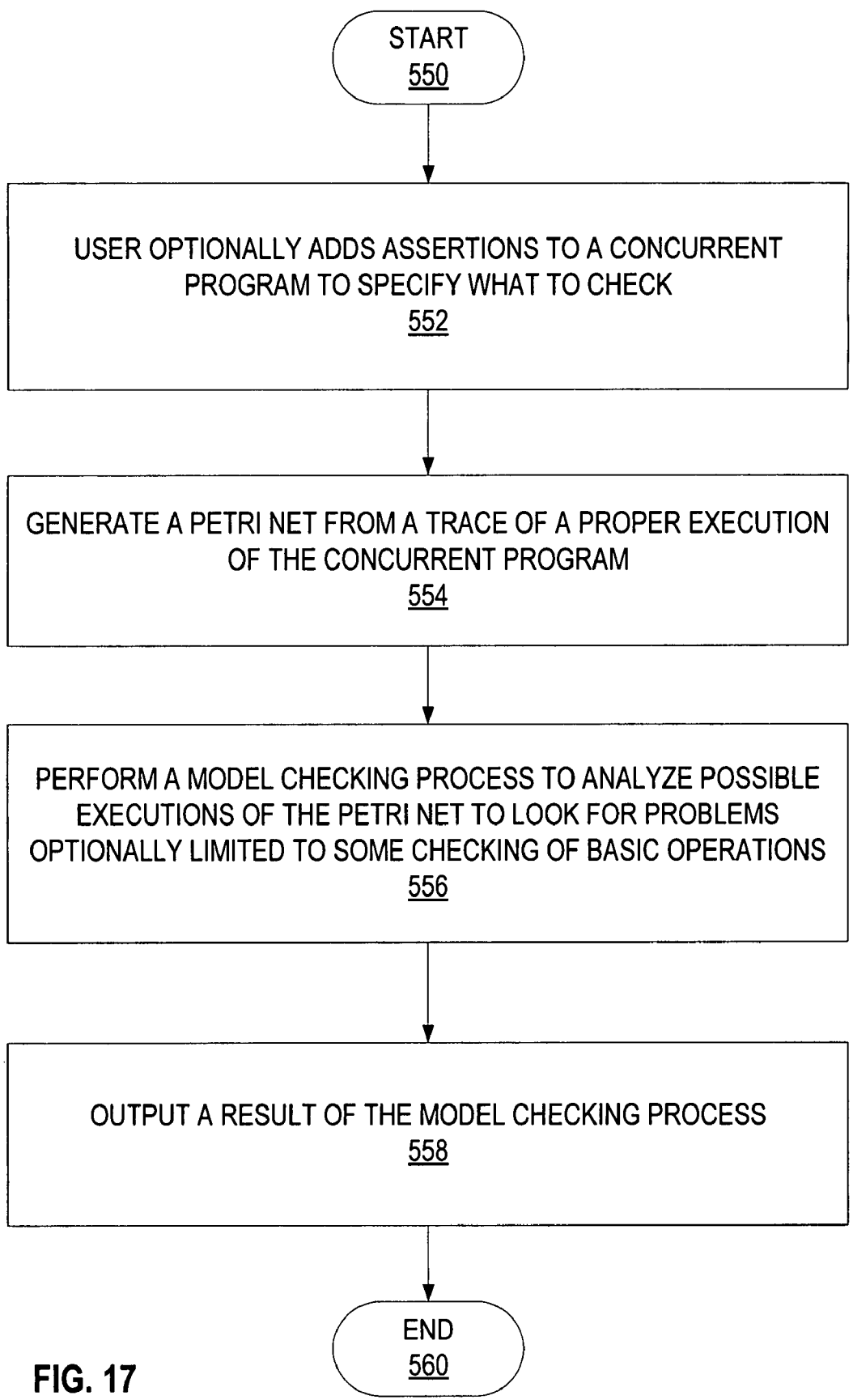
FIG. 17 is a process flow diagram for one implementation of the system of FIG. 1 illustrating the stages involved in performing model checks using Colored Petri Nets.

FIG. 17 illustrates one implementation of the stages involved in performing model checking using Colored Petri Nets. In one form, the process of FIG. 17 is at least partially implemented in the operating logic of computing device 100. The process begins at start point 550 with the user optionally adding assertions to a concurrent program to specify what to check (stage 552). The system generates a Petri Net from traces of a proper execution of the concurrent program (stage 554). The system performs a model checking process to analyze possible executions of the Petri Net to look for problems, with the model checking optionally being limited to some checking of basic operations, given the complexity introduced with using colors (stage 556). The system outputs a result of the model checking process (e.g. displays any potential problems to the user or logs them) (stage 558). The process ends at end point 560.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:
   obtain at least one initial trace from a concurrent program that executed properly;
   use the at least one initial trace to create a Petri Net;
   using the at least one trace to generate unique label or task identifiers for a Petri Net;
   obtain a later trace from a later execution of the concurrent program that did not execute properly; and
   run the later trace against the Petri Net to identify at least one difference by comparing the Petri Net to the later trace corresponding to a subsequent execution of the concurrent program where the concurrent program executed improperly, wherein the comparing includes determining whether a transition in the Petri Net has at least one of the corresponding label or task identifier in the later trace.

2. The computer-readable storage medium of claim 1, further having computer-executable instructions for causing a computer to perform steps comprising: output the identified difference.

3. The computer-readable storage medium of claim 1, wherein the Petri Net is generated with one or more colors that provide additional details.

4. Then computer-readable storage medium of claim 3, wherein the color is a variable that is used for passing data between threads.

5. The computer-readable storage medium of claim 3, wherein the color is used to track an instance of each procedure.

6. Then computer-readable storage medium of claim 3, wherein the color is used to store a thread identifier to identify which thread is executing a giver section.

7. The computer-readable storage medium of claim 3, wherein the color is an index of an array that allows a dynamically allocated array to be represented in the Petri Net.

8. The computer-readable storage medium of claim 1, wherein the Petri Net is created by generating unique task identifiers, generating places of interest, and adding transitions.

9. A method for generating a Petri Net for use in differential debugging of a concurrent program comprising the steps of:
- obtaining at least one trace from a concurrent program that executed properly;
- obtain a later trace from a later execution of the concurrent program that did not execute properly;
- using the at least one trace to generate unique label or task identifiers for a Petri Net;
- using the trace to generate places of interest for the Petri Net;
- adding transitions to the Petri Net;
- storing the resulting Petri Net for later use in differential debugging; and
- comparing the Petri Net to a later trace corresponding to a subsequent execution of the concurrent program where the concurrent program executed improperly, wherein the comparing includes determining whether a transition in the Petri Net has at least one of the corresponding label or task identifier in the later trace.

10. The method of claim 9, wherein the Petri Net is generated with one or more colors that are used to provide additional information.

11. The method of claim 10, wherein variable values are added as colors to the Petri Net.

12. The method of claim 11, wherein variable values for control flow are added as colors to the Petri Net.

* * * * *